US009752870B2

(12) United States Patent
Suzuki et al.

(10) Patent No.: US 9,752,870 B2
(45) Date of Patent: Sep. 5, 2017

(54) INFORMATION PROCESSING APPARATUS, CONTROL METHOD THEREOF AND STORAGE MEDIUM

(71) Applicant: CANON KABUSHIKI KAISHA, Tokyo (JP)

(72) Inventors: Tatsuya Suzuki, Tokyo (JP); Tetsuri Sonoda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 594 days.

(21) Appl. No.: 14/351,730

(22) PCT Filed: Nov. 7, 2012

(86) PCT No.: PCT/JP2012/079445
§ 371 (c)(1),
(2) Date: Apr. 14, 2014

(87) PCT Pub. No.: WO2013/088895
PCT Pub. Date: Jun. 20, 2013

(65) Prior Publication Data
US 2014/0267246 A1     Sep. 18, 2014

(30) Foreign Application Priority Data

Dec. 13, 2011   (JP) ................. 2011-272745

(51) Int. Cl.
*G01B 11/25*   (2006.01)
*G06T 7/521*   (2017.01)
(52) U.S. Cl.
CPC .......... *G01B 11/25* (2013.01); *G01B 11/2513* (2013.01); *G06T 7/521* (2017.01); *G06T 2207/10028* (2013.01)

(58) Field of Classification Search
CPC ..... G01B 11/25; G01B 11/2513; G06T 7/521; G06T 2207/10028
See application file for complete search history.

(56) References Cited

U.S. PATENT DOCUMENTS 6,739,516 B2   5/2004   Iwaki
6,891,970 B1   5/2005   Suzuki
(Continued)

FOREIGN PATENT DOCUMENTS

EP           2372648 A   10/2011
JP      2001147110 A    5/2001
(Continued)

OTHER PUBLICATIONS

Koninckx, T., et al. "Real-time Range Scanning of Deformable Surfaces by Adaptively Coded Structured Light", Proc. IEEE Int'l Conf. 3-D Digital Imaging and Modeling, pp. 293-302, 2003.
(Continued)

*Primary Examiner* — Saptarshi Mazumder
(74) *Attorney, Agent, or Firm* — Fitzpatrick, Cella, Harper & Scinto

(57) ABSTRACT

An information processing apparatus for generating a projection pattern used in three-dimensional measurement of a target object, comprising: determination means for determining a projection code string for generating the projection pattern based on distance information of the target object which is obtained in advance; and generation means for generating a pattern image of the projection pattern based on a projection code string determined by the determination means.

8 Claims, 13 Drawing Sheets

(56) References Cited

U.S. PATENT DOCUMENTS

| | | |
|---|---|---|
| 7,940,981 B2 | 5/2011 | Suwa et al. |
| 8,103,089 B2 | 1/2012 | Suwa et al. |
| 9,082,185 B2 | 7/2015 | Sonoda |
| 2007/0009150 A1* | 1/2007 | Suwa .................... G06T 7/0057 382/154 |
| 2009/0161966 A1 | 6/2009 | Lim |
| 2011/0025708 A1 | 2/2011 | Takeichi et al. |
| 2011/0221891 A1* | 9/2011 | Sonoda .............. G01B 11/2513 348/135 |
| 2013/0076896 A1 | 3/2013 | Takabayashi et al. |
| 2013/0156268 A1 | 6/2013 | Sonoda |
| 2013/0229666 A1 | 9/2013 | Suzuki et al. |

FOREIGN PATENT DOCUMENTS

| | | |
|---|---|---|
| JP | 2002-286415 A | 10/2002 |
| JP | 2007-017355 A | 1/2007 |
| JP | 2011-185872 A | 9/2011 |

OTHER PUBLICATIONS

Pagès, J., et al. "Optimised De Bruijn patterns for one-shot shape acquisition", Image and Vision Computing, vol. 23, Issue 8, pp. 707-720, Aug. 1, 2005.
International Search Report issued in International Application No. PCT/JP2012/079445 dated Dec. 25, 2012.
Joaquim Salvi, et al., "Pattern codification strategies in structured light systems", Pattern Recognition, The Journal of the Pattern Recognition Society, Oct. 2, 2003, pp. 827-849, Elsevier Ltd.

* cited by examiner

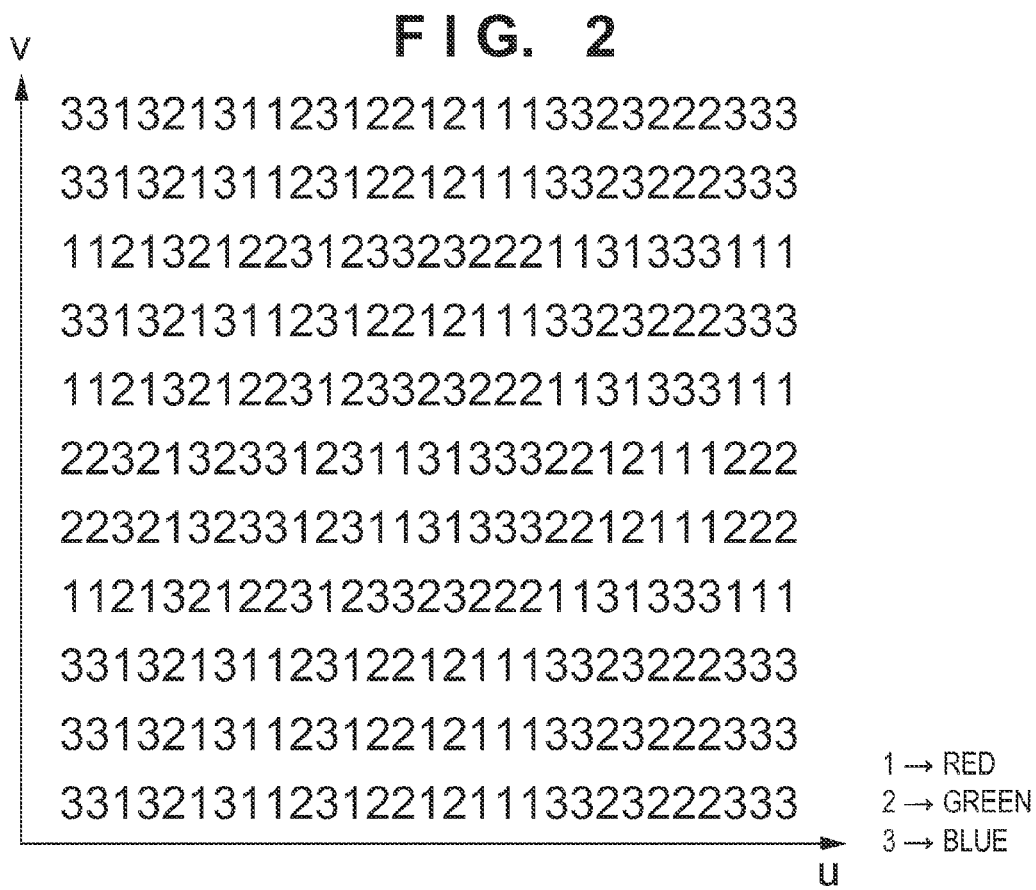

○ RED
⊗ GREEN
○ BLUE

○ RED
⊗ GREEN
○ BLUE

① RED → ①
⊗ GREEN → ②
⊖ BLUE → ③

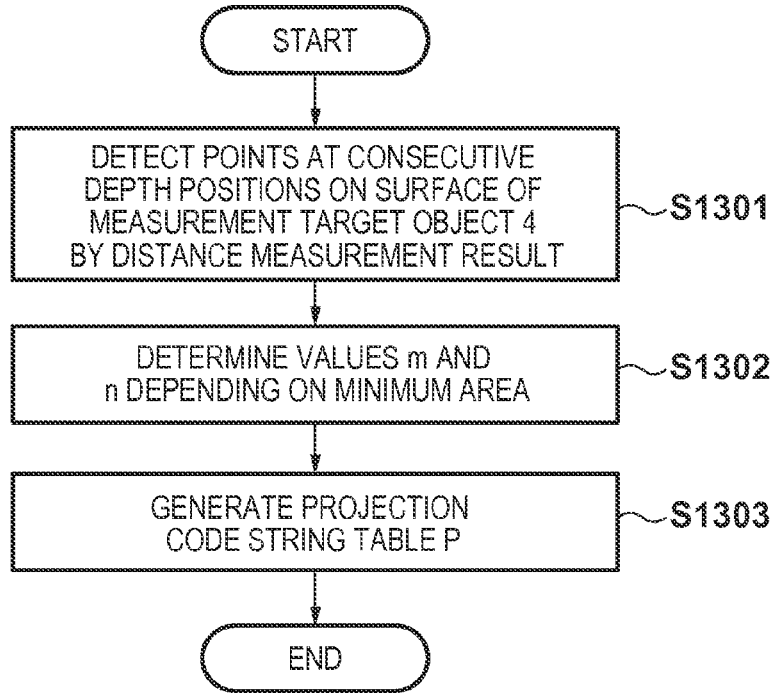
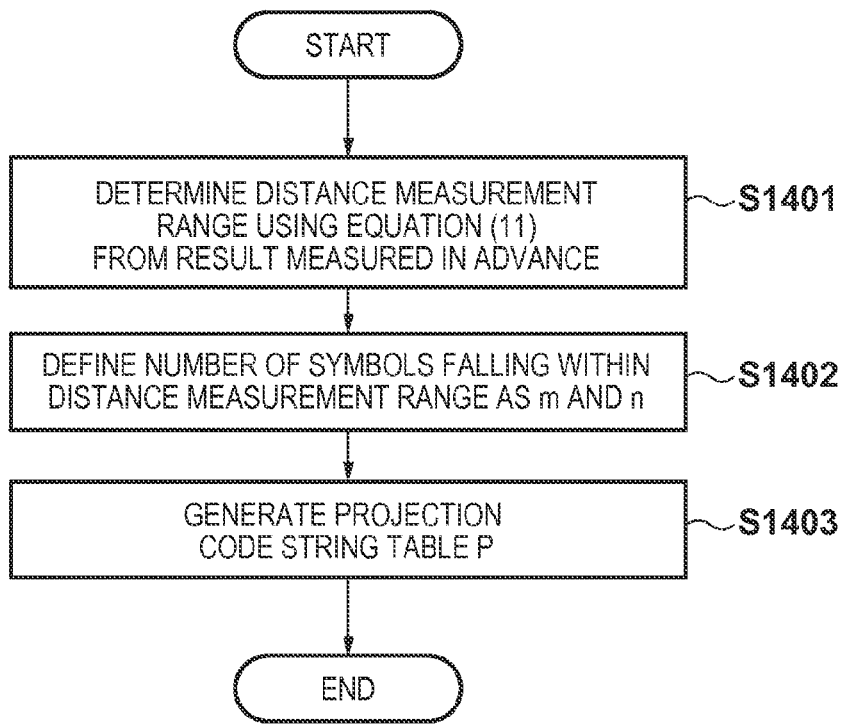

INFORMATION PROCESSING APPARATUS, CONTROL METHOD THEREOF AND STORAGE MEDIUM

TECHNICAL FIELD

The present invention relates to an information processing apparatus, control method thereof, and storage medium.

BACKGROUND ART

An information processing apparatus for generating an image obtained by encoding desired information such as a QR Code® is used in a three-dimensional shape measurement apparatus or a position and orientation estimation apparatus in a decoding imaging capturing apparatus.

Three-dimensional shape measurement apparatuses for measuring the three-dimensional shape of a target object have been used in a variety of industrial fields such as parts inspection in factories and biometric shape measurements in the medical field. Particularly, a noncontact measurement method is effective when an apparatus may contact a target object to deform and damage it.

Various methods are proposed as the three-dimensional shape measurement method. A typical example is a space encoding method. According to the space encoding method, a projector projects an encoded pattern on a measurement target object on a measurement table, light reflected by the measurement target object is captured, and the pattern from the captured image is decoded, thereby obtaining the positions of a pair of points (corresponding points) corresponding to the identical points on the projected pattern image and the camera image. The positions of the corresponding points allow obtain a three-dimensional shape (projection and recess positions) to be obtained on the surface of the measurement target object in accordance with the principle of triangulation. An encoding method using a combination of a plurality of time-series pattern light beams and an encoding method using a combination of a plurality of spatial pattern light beams are available as information used for the above encoding.

An encoding method using a combination of a plurality of spatial pattern light beams is disclosed as an example of three-dimensional shape measurement in Thomas P. Koninckx, Andreas Griesser, Luc Van Gool: "Real-time Range Scanning of Deformable Surfaces by Adaptively Coded Structured Light", Proc. IEEE Int'l Conf. 3-D Digital Imaging and Modeling, pp. 293-302, 2003. In this example, a projector projects, on an object, a pattern characterized by an intersection of two straight lines having different directions. A camera captures light reflected by the object, thereby measuring a three-dimensional shape. The practical procedures will be described below. First, multiple lines (base pattern) used for measurement and a line (code line) having a direction different from the base pattern so as to cross the base pattern are generated as a projection pattern image. The projector projects the projection pattern image on the object, and the camera captures the object projected with the projection pattern image. A camera coordinate system obtains an intersection between the base pattern and the code line, and an epipolar line passing through the intersection is obtained in projector coordinates. At this time, the epipolar line is obtained using a fundamental matrix obtained by calibrating the camera and the projector in advance. The intersection between the epipolar line and the code line is obtained in projector coordinates. A base pattern line nearest to this intersection is specified, thereby making the camera and the projector associate with each other. Finally, the three-dimensional position of each point of the base pattern is obtained in accordance with the principle of triangulation.

However, in Thomas P. Koninckx, Andreas Griesser, Luc Van Gool: "Real-time Range Scanning of Deformable Surfaces by Adaptively Coded Structured Light", Proc. IEEE Int'l Conf. 3-D Digital Imaging and Modeling, pp. 293-302, 2003, the position of the intersection between the epipolar line and the code line becomes ambiguous due to the shape of an object. The nearest base pattern line may not be specified. From this reason, when the median value of the width of lines of the base pattern formed in the captured image is equal to or less than a predetermined value, the line width of the base pattern is increased in the next capturing operation to readily specify an intersection, thereby solving the ambiguity in association.

For this reason, in Thomas P. Koninckx, Andreas Griesser, Luc Van Gool: "Real-time Range Scanning of Deformable Surfaces by Adaptively Coded Structured Light", Proc. IEEE Int'l Conf. 3-D Digital Imaging and Modeling, pp. 293-302, 2003, the number of lines to be displayed is reduced due to an increase in line width of the base pattern, thereby undesirably reducing the measurement density in three-dimensional measurement.

SUMMARY OF INVENTION

In consideration of the above problem, the present invention provides a technique for reducing the ambiguity in association between a camera and a projector in three-dimensional measurement without decreasing the measurement density, thereby improving the precision of three-dimensional measurement.

According to one aspect of the present invention, there is provided an information processing apparatus for generating a projection pattern used in three-dimensional measurement of a target object, comprising: determination means for determining a projection code string for generating the projection pattern based on distance information of the target object which is obtained in advance; and generation means for generating a pattern image of the projection pattern based on a projection code string determined by the determination means.

According to one aspect of the present invention, there is provided a control method for an information processing apparatus for generating a projection pattern used in three-dimensional measurement of a target object, comprising: a determination step of determining a projection code string for generating the projection pattern based on distance information of the target object which is obtained in advance; and a generation step of generating a pattern image of the projection pattern based on a projection code string determined in the determination step.

Further features of the present invention will become apparent from the following description of exemplary embodiments with reference to the attached drawings.

BRIEF DESCRIPTION OF DRAWINGS

FIG. 2 is a view showing a projection code string used in generation of a projection pattern image;

FIG. 3 is a view showing a partial code string of the projection code string;

FIG. 13 is a flowchart showing the processing sequence in step S1202;

FIG. 14 is a flowchart showing the processing sequence according to the third embodiment;

DESCRIPTION OF EMBODIMENTS

Exemplary embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

(First Embodiment)

Figure 1:
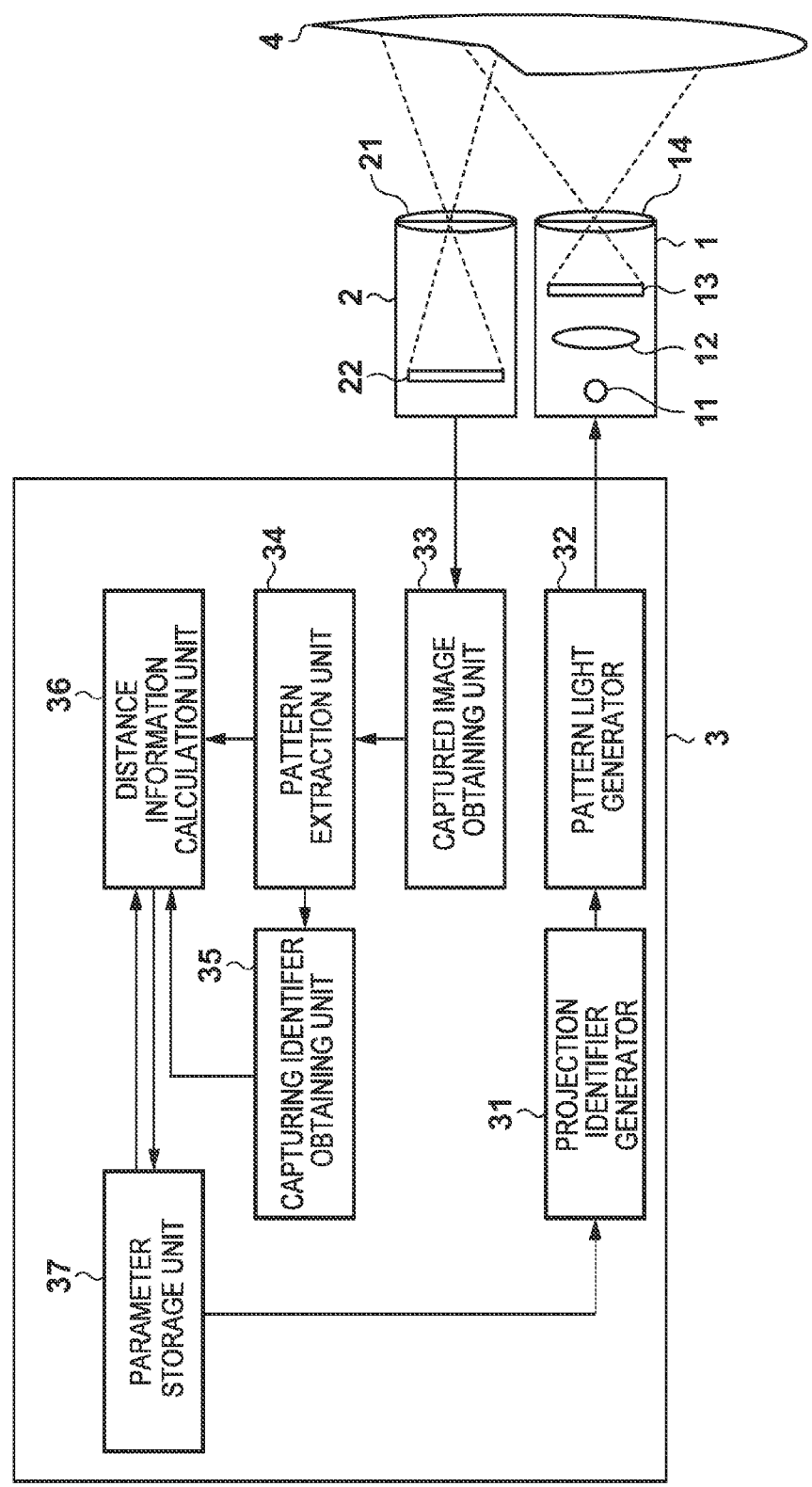
FIG. 1 is a diagram showing the overall arrangement of a three-dimensional shape measurement apparatus according to the first embodiment.

The arrangement of an information processing apparatus according to the first embodiment will be described with reference to FIG. 1. A three-dimensional shape measurement apparatus according to the first embodiment includes a projection unit 1, image capturing unit 2, and control/calculation unit 3. The projection unit 1 projects pattern light on a measurement target object 4. The image capturing unit 2 captures the image of the measurement target object 4 upon projecting pattern light thereon. The control/calculation unit 3 controls the operations of the projection unit 1 and the image capturing unit 2 and measures the three-dimensional shape of the measurement target object 4 based on the captured image data.

The projection unit 1 includes a light source 11, illumination optical system 12, display element 13, and projection optical system 14. The light source 11 is formed from a variety of light-emitting elements such as a halogen lamp and LED. The illumination optical system 12 is formed from an optical system having a function of guiding light emitted from the light source 11 to the display element 13. The display element 13 has a function for spatially controlling the transmittance or reflectance when further guiding, to the projection optical system 14, the light guided from the illumination optical system 12. The projection optical system 14 is an optical system configured to focus the light guided from the display element 13 at a specific position of the measurement target object 4.

The image capturing unit 2 includes an image capturing lens 21 and an image sensor 22. The image capturing lens 21 is an optical system configured to focus the specific position of the measurement target object 4 onto the image sensor 22. The image sensor 22 is formed from a variety of photoelectric conversion elements such as a CMOS sensor or CCD sensor. The position and orientation of the image capturing unit 2 are adjusted so that the x-axis in the image coordinate system of the image sensor 22 is made parallel to a straight line connecting the center positions of the optical axes of the projection unit 1 and the image capturing unit 2.

The control/calculation unit 3 includes a projection identifier generator 31, pattern light generator 32, captured image obtaining unit 33, pattern extraction unit 34, image capturing identifier obtaining unit 35, distance information calculation unit 36, and parameter storage unit 37.

The hardware of the control/calculation unit 3 is configured by a general-purpose computer (hardware) including a CPU, a storage unit (for example, a memory and a hard disk), and various input/output interfaces. The software of the control/calculation unit 3 is implemented by executing a pattern light generation program and distance measurement program for causing a computer to execute the operation of the three-dimensional shape measurement apparatus according to this embodiment. The CPU executes the pattern light generation program and distance measurement program, thereby implementing the processing operations of the respective processors such as the projection identifier generator 31, the pattern light generator 32, the captured image obtaining unit 33, the pattern extraction unit 34, the capturing identifier obtaining unit 35, the distance information calculation unit 36, and the parameter storage unit 37.

According to this embodiment, the projection identifier generator 31 determines the shape and size of a partial projection code string indicating a uniquely determining feature in the projection code string. The projection identifier generator 31 generates a projection code string formed from codes denoted by numbers 1, 2, and 3 shown in FIG. 2. Number 1 corresponds to red; number 2, green; and number 3, blue.

Figure 5:
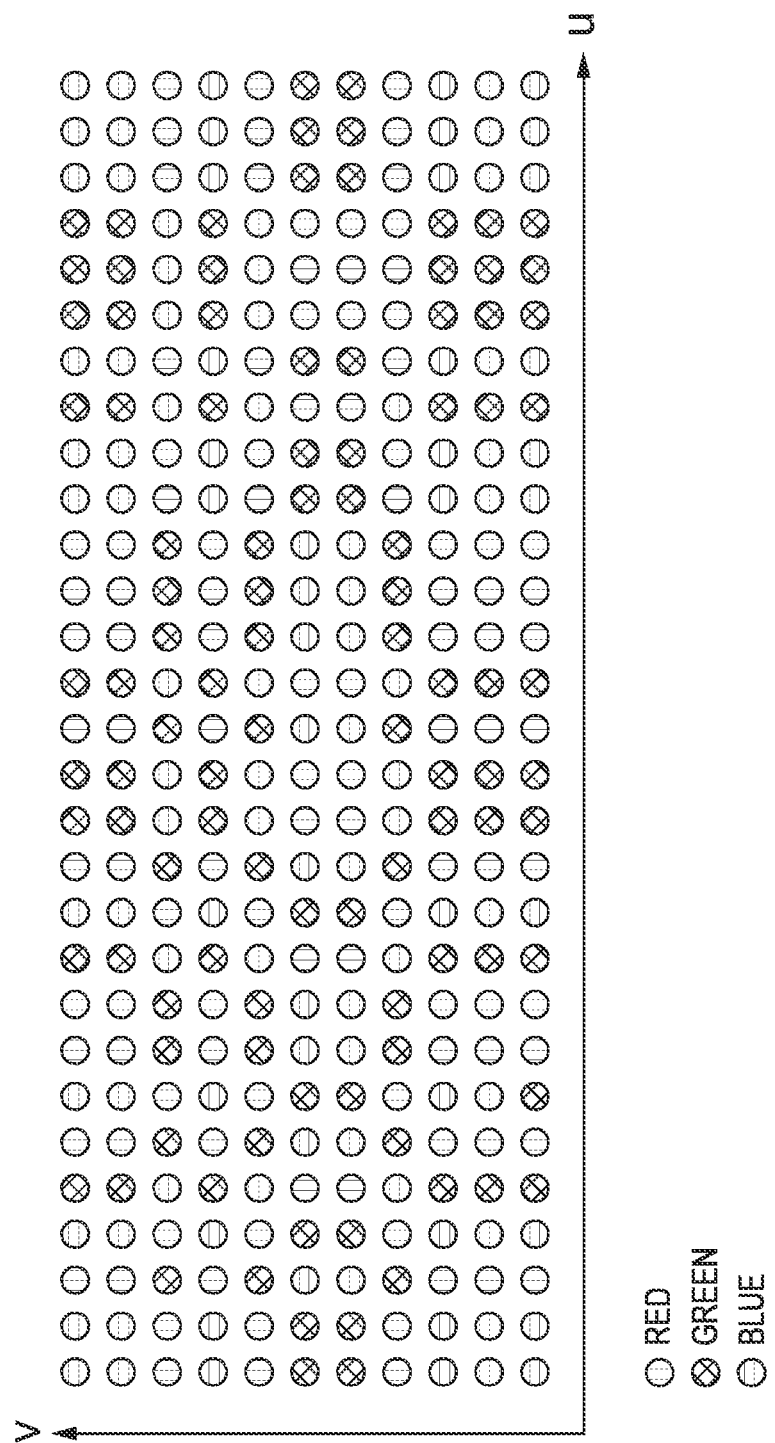
FIG. 5 is a view showing a projection pattern image.

The pattern light generator 32 generates the codes 1, 2, and 3 of the projection code string as images symbolized into corresponding red, green, and blue point strings shown in FIG. 5. The pattern light generator 32 outputs the symbolized images to the projection unit 1 via a general-purpose display interface such as DVI as needed.

The captured image obtaining unit 33 receives a digital image signal which is sampled and quantized by the image capturing unit 2. The captured image obtaining unit 33 also has a function of obtaining image data expressed by luminance values (density values) of the respective pixels from the received image signal and storing the obtained image data in the parameter storage unit 37. The captured image obtaining unit 33 further has a function of controlling the operation (image capturing timing and the like) of the image capturing unit 2 via a general-purpose communication interface such as RS232c or IEEE488.

The pattern extraction unit 34 extracts only a captured point string that corresponds to the portion irradiated with the projection pattern image on the measurement target object 4 from the image data obtained by the captured image obtaining unit 33.

The capturing identifier obtaining unit 35 obtains the codes of the respective points corresponding to the respective colors as a captured code string from the captured point string extracted by the pattern extraction unit 34.

The distance information calculation unit 36 associates the projection image and the captured image with each other in accordance with the shape of the partial projection code string representing the uniquely determining feature in the projection code string. The distance information calculation unit 36 calculates distance information, that is, a shape indicating a distance between the image capturing unit 2 and the measurement object 4 on which the projection pattern image is projected, using the principle of triangulation.

The parameter storage unit 37 stores distance information and parameters required to calculate a three-dimensional distance. The parameters include device parameters of the projection unit 1 and the image capturing unit 2, internal parameters of the projection unit 1 and the image capturing unit 2, and external parameters of the projection unit 1 and the image capturing units 2. The device parameters include the number of pixels of the display element 13, the number of pixels of the image sensor 22, and the like. The internal parameters of the projection unit 1 and the image capturing unit 2 include focal lengths, image centers, image distortion coefficients corresponding to distortion. The external parameters of the projection unit 1 and the image capturing unit 2 include a translation matrix and rotation matrix indicating the relative positional relationship between the projection unit 1 and the image capturing unit 2.

In this embodiment, the projection code string generated by the projection identifier generator 31 is configured by two-dimensional, horizontal and vertical elements in the u and v directions, as shown in FIG. 2 and is encoded using the following rule. More specifically, the two-dimensional (vertical and horizontal) projection code string is generated by a pseudo random number generation method using N-ary (N is an integer of two or more) codes, each of which is given in each of the vertical and horizontal directions. According to this embodiment, each of two de Bruijn sequences is selected in a corresponding one of in the u and v directions, that is, the horizontal and vertical directions.

The de Bruijn sequence is a sequence having a period I. Taking consecutive m elements of the sequence as an example, all patterns appear only once in the period. Letting k be the number of symbols which can be used as a projection pattern image and m×(n+1) be the size of a rectangle surrounding a sampling shape, the de Bruijn sequence in the u direction selects Iu=km, while the de Bruijn sequence in the v direction selects Iv=kn. According to this embodiment, since three colors are used as symbols, k=3 is given. Since the shape of the partial code string is surrounded by rectangles each having a size of 3×3, m=3 and n=2 are given. The de Bruijn sequence of k=3 and m=3 (sequence length: 3^3=27) used in the u direction of this embodiment is given by:

$$Vhm = 3313213112\ 3122121113\ 3232223 \quad (1)$$

Similarly, the de Bruijn sequence of k=3 and n=2 (sequence length: 3^2=9) used in the v direction of this embodiment is given by:

$$Vvm = 312113223 \quad (2)$$

A method of generating a projection code string using the above two de Bruijn sequences will be described below. A projection code string $f_{ij}$ to be generated uses the de Bruijn sequence in the u direction directly as the projection code string for the u direction i=(the first row) for the first time as given by equation (3):

$$f_{1j} = Vhm_j \quad (3)$$

From the second row in the u direction, projection code strings $f_{ij}$ are given by:

$$f_{ij} = 1 + (f_{i-1,j} + Vvm_j) \bmod k \quad (4)$$

A result obtained by adding the De Bruijn sequence in the u direction to the immediately preceding row is defined as a code string. The sum is represented by a k-ary number of 1 to k, and a carry is neglected. By adding each of all the de Bruijn sequences in the u direction to obtain a code string as described above, the two-dimensional projection code string in the u and v directions as shown in FIG. 2 can be obtained.

As shown in FIG. 3, the projection code string generated by the above method has a feature that only one partial code string of lengths m and n sampled in an order of equation (5) having a predetermined fixed row and a predetermined fixed column in an area surrounded by a rectangle located at an arbitrary position and having a size of m×n in the projection code string exists in the projection code string.

$$\text{code order} = w_{i,j}, w_{i,j-1}, w_{i-1,j}, w_{i,j+1}, w_{i+1,j} \quad (5)$$

where i and j are code sampling coordinates.

Equation (5) indicates an order when the sampling shape is a cross, as shown in FIG. 3. The sampling shape may be changed depending on the sampling length, and sampling may be done in an arbitrary order.

Figure 4:
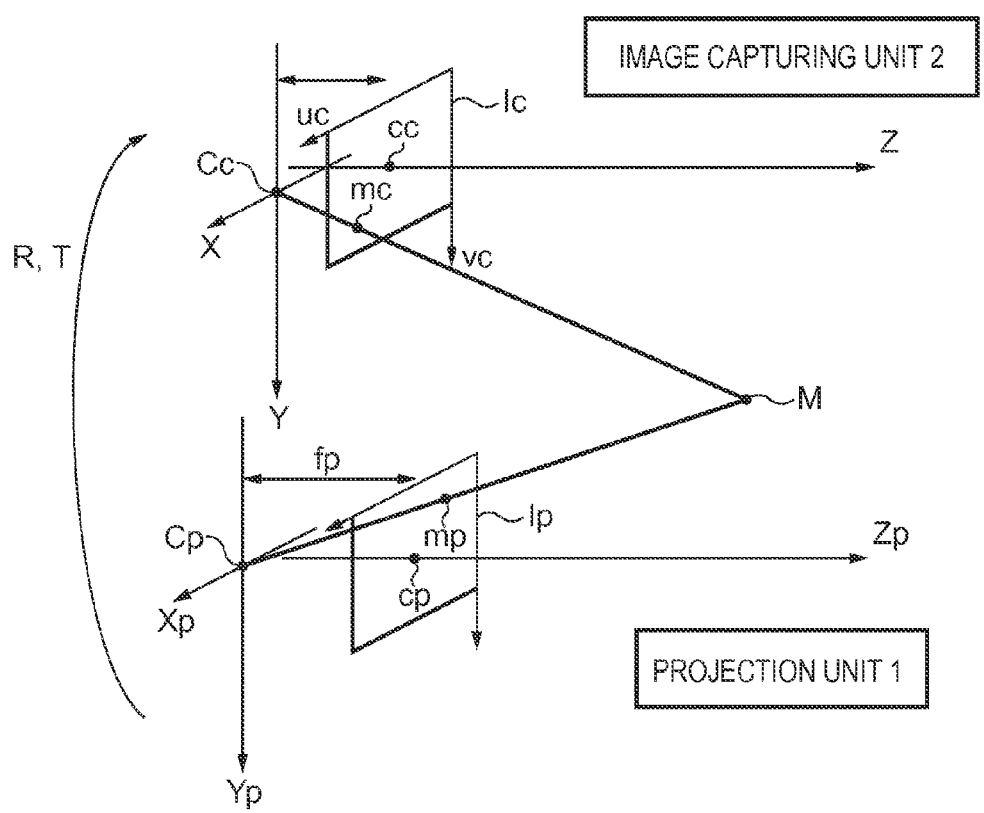
FIG. 4 is a view for explaining the principle of distance measurement by triangulation.

The principle of distance measurement using triangulation performed by the distance information calculation unit 36 will be described below with reference to FIG. 4. Letting Cc be the optical center of the image capturing unit 2, Ic be an image plane, fc be a focal length, (uco, vco) be the pixel coordinates of the image center cc, and Psc be the pixel size of the image sensor 22, an intrinsic matrix Ac of the image capturing unit 2 is defined by:

$$Ac = \begin{bmatrix} fc/Psc & 0 & uco \\ 0 & fc/Psc & vco \\ 0 & 0 & 1 \end{bmatrix} \quad (6)$$

Letting Cp be the optical center of the projection unit 1, Ip be an image plane, fp be a focal length, (upo, vpo) be the pixel coordinates of an image center cp, and Psp be the pixel size of the display element 13, an intrinsic matrix Ap of the projection unit 1 is defined by:

$$Ap = \begin{bmatrix} fp/Psp & 0 & upo \\ 0 & fp/Psp & vpo \\ 0 & 0 & 1 \end{bmatrix} \quad (7)$$

The intrinsic matrix Ac of the image capturing unit 2 and the intrinsic matrix Ap of the projection unit 1 are calculated using an intrinsic parameter calibration method as a known technique.

The extrinsic parameters representing the relative positional relationship between a camera coordinate system XYZ of the image capturing unit 2 and a camera coordinate system XpYpZp of the projection unit 1 are a rotation matrix R and a translation matrix T. The rotation matrix is a 3×3 matrix, and the translation matrix T is a 3×1 matrix. The rotation matrix R and the translation matrix T are calculated using an extrinsic parameter calibration method as a known technique.

The coordinates of a point M in a three-dimensional space having the camera coordinate system of the image capturing unit 2 as the origin are defined as (X, Y, Z). The pixel coordinates of a point mc obtained by projecting a point M on the image plane Ic of the image capturing unit 2 are defined as (uc, vc). The correlation between these coordinates is defined by:

$$s \begin{bmatrix} uc \\ vc \\ 1 \end{bmatrix} = [Ac \ 0] \begin{bmatrix} X \\ Y \\ Z \\ 1 \end{bmatrix} \quad (8)$$

$$= \begin{bmatrix} C_{11} & C_{12} & C_{13} & C_{14} \\ C_{21} & C_{22} & C_{23} & C_{24} \\ C_{31} & C_{32} & C_{33} & C_{34} \end{bmatrix} \begin{bmatrix} X \\ Y \\ Z \\ 1 \end{bmatrix}$$

where s is a scalar value. The pixel coordinates of a point mp obtained by projecting the same point M on the image plane Ip of the projection unit 1 are defined as (up, vp). The correlation between these coordinates is defined by:

$$s' \begin{bmatrix} up \\ vp \\ 1 \end{bmatrix} = \begin{bmatrix} R & T \\ 0 & 1 \end{bmatrix} [Ap \ 0] \begin{bmatrix} X \\ Y \\ Z \\ 1 \end{bmatrix} \quad (9)$$

$$= \begin{bmatrix} P_{11} & P_{12} & P_{13} & P_{14} \\ P_{21} & P_{22} & P_{23} & P_{24} \\ P_{31} & P_{32} & P_{33} & P_{34} \end{bmatrix} \begin{bmatrix} X \\ Y \\ Z \\ 1 \end{bmatrix}$$

where s' is a scalar value. The development of equations (8) and (9) yields the following four simultaneous equations:

$$\left. \begin{array}{l} (C_{11} - C_{31}uc)X + (C_{12} - C_{32}uc)Y + (C_{13} - C_{33}uc)Z = C_{34}uc - C_{14} \\ (C_{21} - C_{31}vc)X + (C_{22} - C_{32}vc)Y + (C_{23} - C_{33}vc)Z = C_{34}vc - C_{24} \\ (P_{11} - P_{31}up)X + (P_{12} - P_{32}up)Y + (P_{13} - P_{33}up)Z = P_{34}up - P_{14} \\ (P_{21} - P_{31}vp)X + (P_{22} - P_{32}vp)Y + (P_{23} - P_{33}vp)Z = P_{34}vp - P_{24} \end{array} \right\} \quad (10)$$

The pixel coordinates (uc, vc) of the point mc and the pixel coordinates (up, vp) of the point mp are obtained by a pattern projection method such as a space encoding method. Since $C_{ij}$ (i=1 to 3, j=1 to 3) and $P_{ij}$ (i=1 to 3, j=1 to 3) are calculated by the intrinsic matrices and the extrinsic parameters, they can be obtained by calibration in advance. Only the coordinate values (X, Y, Z) of the point M in equation (9) are unknown, and the simultaneous equations can be solved by obtaining the coordinate values (X, Y, Z). Note that since the coordinate values of the point M as unknown values are three, that is, (X, Y, Z), the calculation of any one of the pixel coordinate values (up, vp) of the projection unit 1 allows to calculate the coordinate values of the point M. The principle of distance measurement based on the triangulation has been described.

Figure 6:
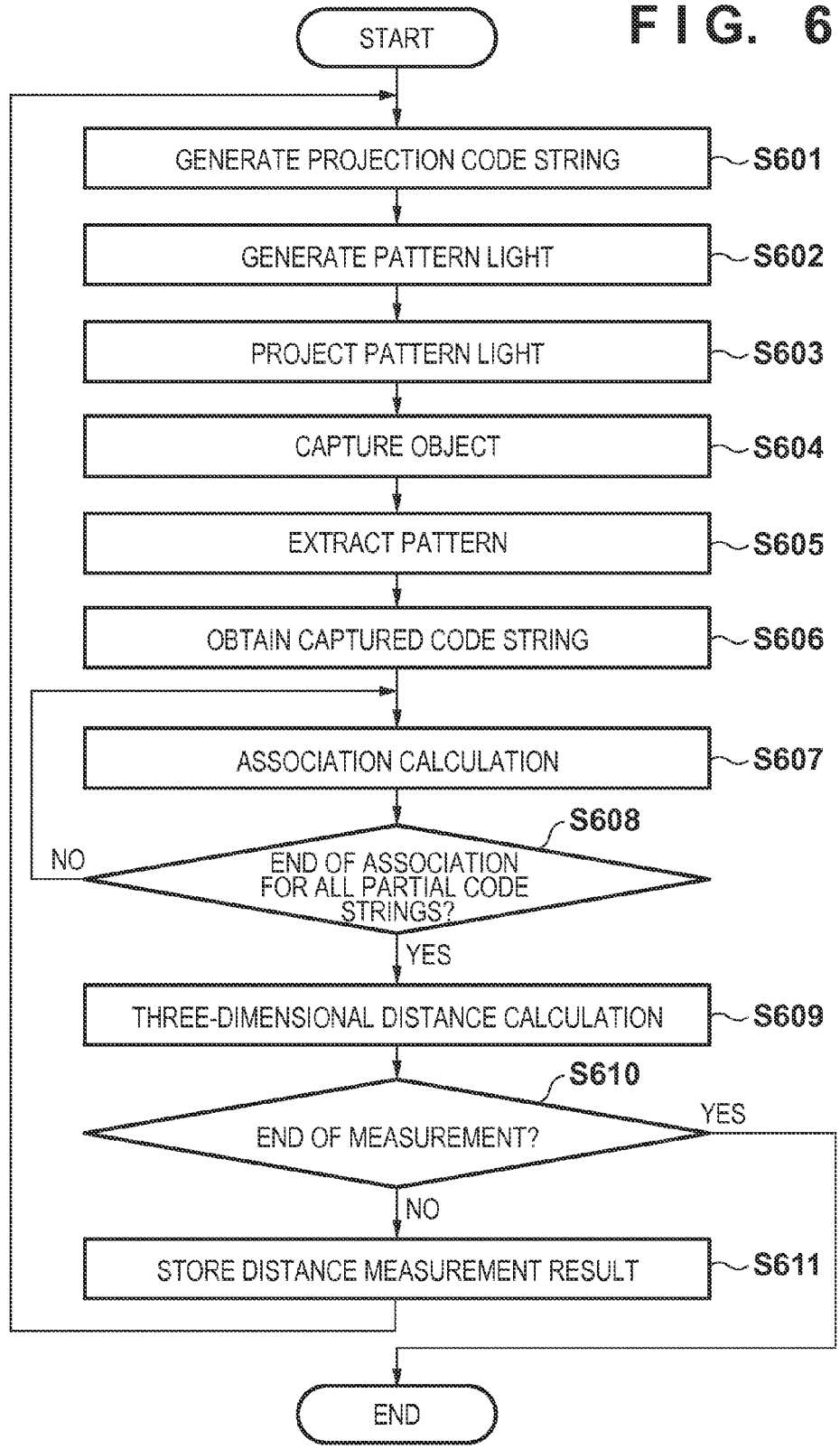
FIG. 6 is a flowchart showing a processing sequence of the three-dimensional shape measurement apparatus according to the first embodiment.

The processing sequence of the three-dimensional shape measurement apparatus according to the first embodiment will be described with reference to the flowchart in FIG. 6.

In step S601, the projection identifier generator 31 determines the sampling size of m×n based on the distance information obtained in advance and generates a projection code string in accordance with the De Bruijn sequences. Processing for determining the sampling size of m×n based on the distance information obtained in advance will be described later with reference to FIG. 10.

In step S602, the pattern light generator 32 generates a projection pattern image. As shown in FIG. 5, the projection pattern image to be generated is formed from a string of points colored with three colors, red, green, and blue and regularly arranged in the horizontal and vertical directions. The point string of red, green, and blue serves as symbols expressing the projection code string. The order of points is determined using the projection code string shown in FIG. 2. The pattern light generator 32 assigns 1, 2, and 3 of the projection code string as red, green, and blue in the projection pattern image, thereby generating the projection pattern image.

In step S603, the projection unit 1 projects the projection pattern image generated in step S602 on the measurement target object 4.

Figure 7A:
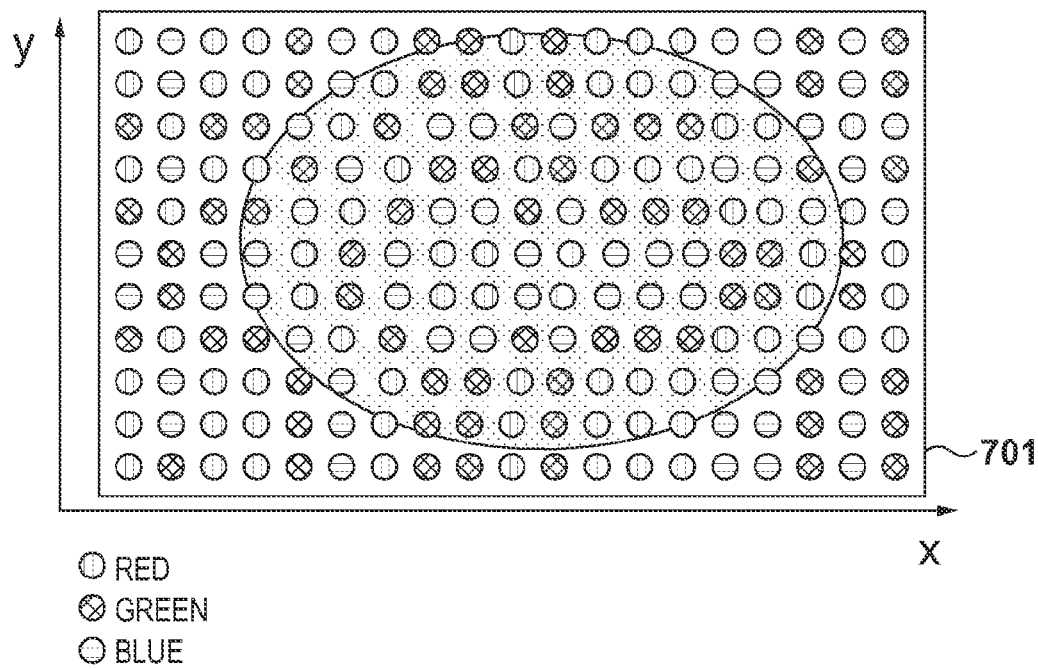
FIG. 7A is a view showing a captured image 701.

In step S604, the image capturing unit 2 captures the measurement target object 4 on which the projection pattern image is projected. The captured image obtaining unit 33 receives a digital image signal sampled and quantized by the image capturing unit 2. A captured image 701 in which the projection code string at the central portion are distorted by parts is obtained, as shown in FIG. 7A.

Figure 7B:
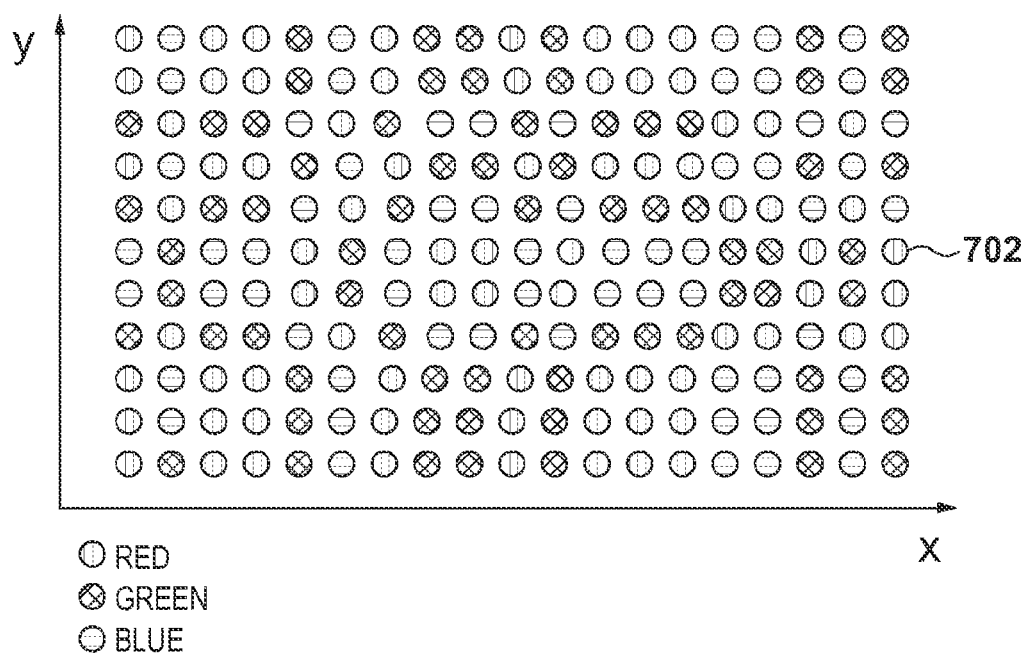
FIG. 7B is a view showing a captured point string 702 extracted from the captured image.

In step S605, from the captured image 701 generated in step S604, the pattern extraction unit 34 extracts a captured point string 702 which is a captured pattern corresponding to the projection pattern image irradiated on the measurement target object 4, as shown in FIG. 7B. In this embodiment, the pattern extraction unit 34 extracts the captured point string 702 by extracting a region having a predetermined luminance level or more in the colors of red, green, and blue. Note that all the extracted pieces of color information are held. One continuous region having a single color is handled as a unit image capturing point, and a two-dimensional position on the coordinate system xy in the captured image is held for each image capturing point.

In step S606, the image capturing identifier obtaining unit 35 obtains a captured code string added to the captured point string 702 extracted in step S605.

Figure 8:
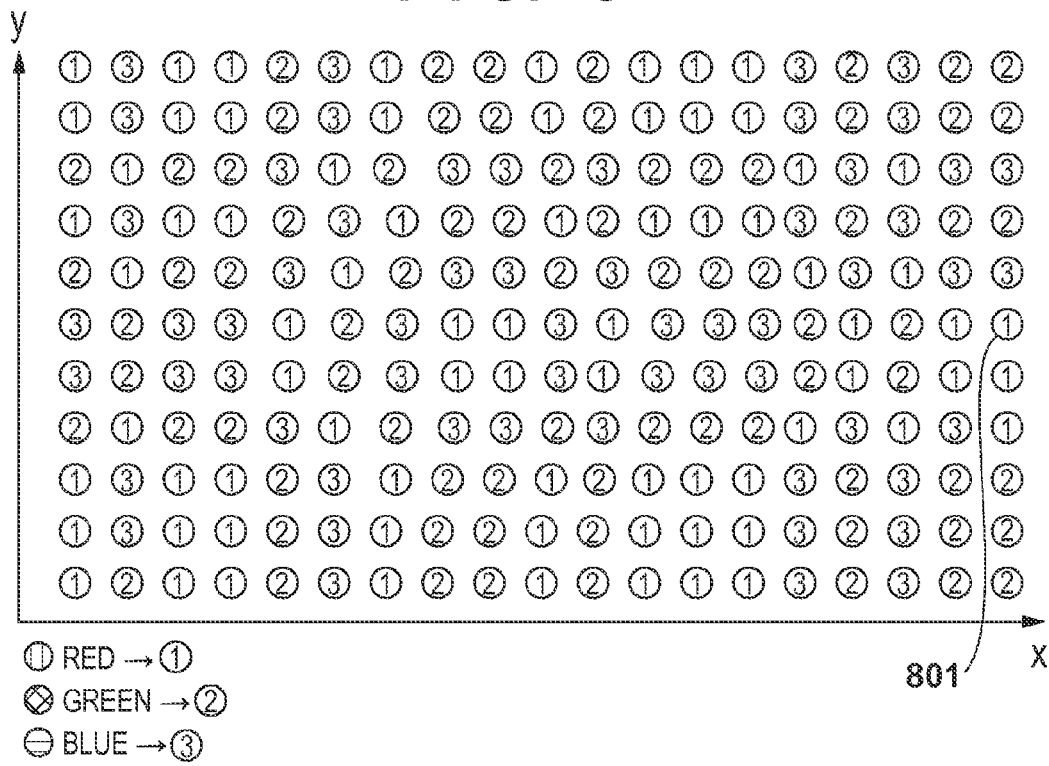
FIG. 8 is a view showing a captured code string 801.
Figure 9:
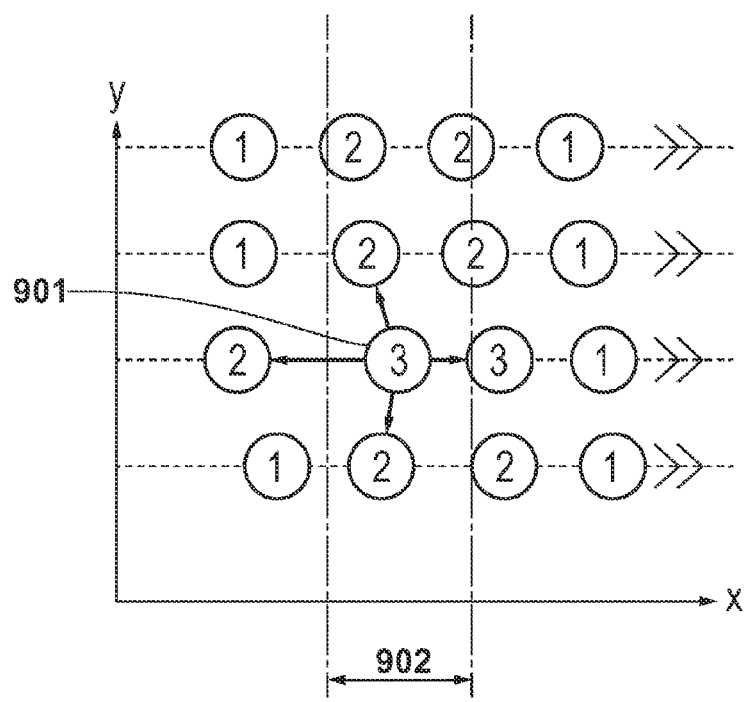
FIG. 9 is a view showing an enlarged state of part of the captured code string.

More specifically, the image capturing identifier obtaining unit 35 decodes a code to which a point of each color is assigned as a symbol in step S601. That is, the unit 35 obtains a captured code string using red, green, and blue as 1, 2, and 3. For a unit pictured code forming the captured code string, the decoded code and the two-dimensional position of the coordinates u and v on the projection pattern of the corresponding to the image capturing point are held. FIG. 8 shows the decoded captured code string 801. The relationship with codes adjacent to the upper, lower, right, and left captured codes is restored. FIG. 9 shows an enlarged state of part of the decoded captured code string 801. As an example, the relationship of the adjacent codes in a captured code 901 of interest in FIG. 9 is restored. Since the position and orientation of the image capturing unit 2 are adjusted so that the x-axis in the image coordinate system on the image capturing unit 2 is almost parallel to the straight line passing through the central positions of the two optical axes of the projection unit 1 and the image capturing unit 2, all the captured point strings are captured almost parallel to the x-axis. The connection relationship between the captured code strings can be easily restored. At first, codes most adjacent to the right and left (x direction) of the captured code 901 of interest are searched as adjacent codes. The relationship between the adjacent codes in the y direction, that is, the vertical direction is searched. At this time, since adjacent codes having the y direction not parallel to the y-axis, but having offsets in the x direction exist, a search range 902 is set in the x direction, and the adjacent codes are searched within this search range. According to this embodiment, the captured code of interest and its adjacent codes which form a partial capture code string of m (x direction)×n (y direction) codes are held on each captured code basis.

In step S607, the distance information calculation unit 36 scans the captured code string obtained by the captured code string obtaining unit 35 in step S606 and collates this captured code string with a projection code string table P (to be described later). Upon completion of collation, the projection pattern image is associated with the captured image, and the associated positions are calculated. The process then advances to step S608. If no collation can be made, no association calculation is made. The process advances to step S608. In this embodiment, the partial captured code string of m (x direction)×n (y direction) including the captured code of interest and its adjacent codes is scanned. The result is used to collate the captured code string with the projection code string table P.

In step S608, the distance information calculation unit 36 determines whether the association calculation processing in step S607 is executed for all the partial code strings. If the distance information calculation unit 36 determines that the association calculation processing is executed for all the partial code strings (YES in step S608), the process advances to step S609; otherwise (NO in step S608), the process returns to step S607.

In step S609, the distance information calculation unit 36 measures the three-dimensional shape of the measurement target object 4 by the principle of triangulation using the two-dimensional coordinates of the projection pattern image and captured image held by the capturing points associated in step S607.

In step S610, the distance information calculation unit 36 determines, for example, based on whether a measurement end instruction is received from the user within a predetermined time upon completion of the measurement of the three-dimensional shape, whether the measurement ends. Note that the end of measurement may be determined not by the presence/absence of the measurement end instruction from the user, but by whether the measurements are performed by a predetermined number of times. When the distance information calculation unit 36 determines the end of measurement (YES in step S610), processing ends; otherwise (NO in step S610), the process advances to step S611.

In step S611, the distance information calculation unit 36 holds the measured distance information in the parameter storage unit 37. Thereafter, the process returns to step S601.

Figure 10:
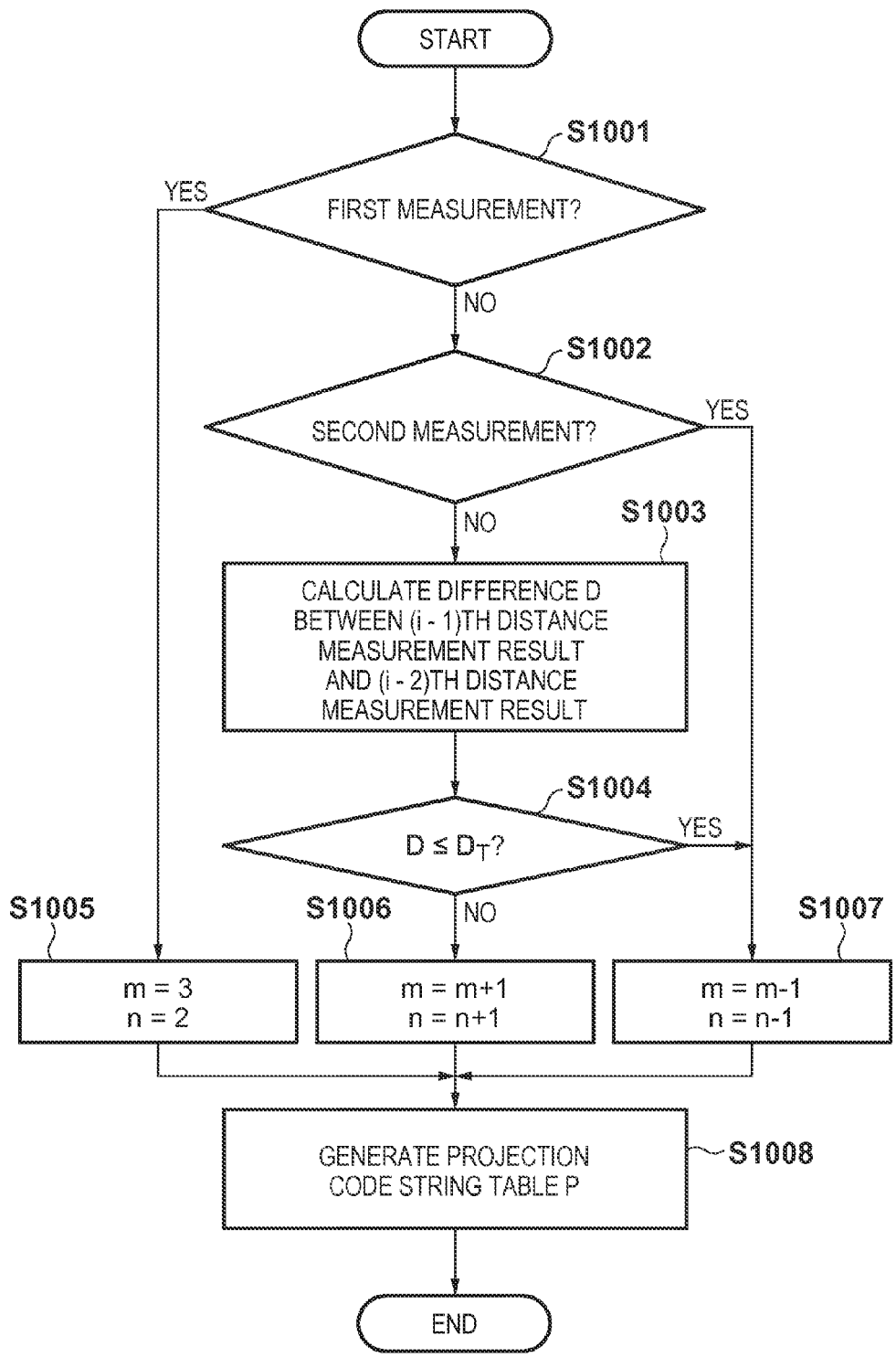
FIG. 10 is a flowchart showing the processing sequence in step S1001.

A processing sequence for determining the sampling size of m×n based on the distance information obtained in step S601 in advance will be described with reference to the flowchart of FIG. 10.

In step S1001, the projection identifier generator 31 determines whether the current measurement is the first measurement. If the unit 31 determines that the current measurement is the first measurement (YES in step S1001), the process advances to step S1005; otherwise (NO in step S1001), the process advances to step S1002.

In step S1002, the projection identifier obtaining unit 31 determines whether the current measurement is the second measurement. If the unit 31 determines that the current measurement is the second measurement (YES in step S1002), the process advances to step S1007; otherwise (NO in step S1002), the process advances to step S1003.

In step S1003, the projection identifier generator 31 calculates a difference between the pieces of distance information measured in (i−1)th and (i−2)th distance information measurements and stored in the parameter storage unit 37.

The unit 31 then calculates a sum D of the absolute values of the differences. In step S1004, the projection identifier generator 31 determines whether the sum D of the absolute values of the differences calculated in step S1003 is equal to or less than a predetermined threshold DT. If D is equal to or less than DT (YES in step S1004), the process advances to step S1007; otherwise (NO in step S1004), the process advances to step S1006.

In step S1005, the projection identifier generator 31 gives arbitrary initial values to m and n which configure the sampling size. In this embodiment, 3 and 2 are given as the initial values to the m and n, respectively. Thereafter, the process advances to step S1008. In step S1006, the projection identifier generator 31 adds 1 to each of m and n which configure the previous sampling size. Thereafter, the process advances to step S1008.

In step S1007, the projection identifier generator 31 subtracts 1 from each of m and n which configure the previous sampling size. Note that the lengths m and n of the partial code string are continuously subtracted until m=1 and n=1. Thereafter, the process advances to step S1008.

In step S1008, the projection identifier generator 31 generates the projection code string table P in accordance with the lengths m and n of the partial code string determined in step S1005, S1006, or S1007, and processing ends. The projection code string table P stores values of the code string when the projection code string is sampled with the lengths m and n at the two-dimensional (u and v) position. As will be described later, use of the projection code string table P allows to easily perform the association calculation between the projection code string and the captured code string without any cumbersome calculations.

As has been described above, based on the distance information of the target object obtained in advance, the information processing apparatus according to the first embodiment determines the partial projection code string (m×n sampling code string) constituting the projection code string (for example, the de Bruijn sequence) used to generate the projection pattern. In addition, the information processing apparatus generates the projection pattern based on the partial projection code string and projects it on the target object. The information processing apparatus extracts the captured pattern from the image on which the projection pattern is projected and obtains the captured code string (for example, the de Bruijn sequence) constituting the captured code string. The partial projection code string and partial captured code string are collated and associated with each other. The distance information of the target object is measured based on this association.

With the above processing, this embodiment allows the three-dimensional measurement capable of executing unique association processing without changing the measurement density, while the conventional technique performs three-dimensional measurement by changing the measurement density. The necessary continuation surface required for association processing can be reduced based on the distance information. Robust three-dimensional measurement can be performed for an object having a complex shape as compared with the conventional technique. When the length of the partial code string is reduced, the calculation load can be reduced. The length of the partial code string is reduced as needed using the distance information, thereby balancing the measurement precision and the processing speed for the measurement target object which allows image capturing.

According to this embodiment, a surface required for association processing is set large to perform coarse measurement in the first measurement cycle. The surface required for association processing is gradually reduced from the previous measurement result to perform fine measurement in the second and subsequent measurement cycles. In this manner, an object having a complex shape can be precisely measured by a plurality of measurements. In addition, fine shifts in the depths of the measurement target object, the image capturing unit, and the projection unit can be coped with by changing the surface required for association processing.

The projection identifier generator 31 need not generate the projection code string in step S601 for each process. The projection code string generated once may be stored in the parameter storage unit 37 and is read out from the parameter storage unit 37 as needed. When the object to be captured is limited and an optimal projection pattern image is determined beforehand, processing can be simplified to shorten the processing time.

The pattern light generator 32 need not generate the projection pattern image in step S602 for each process. The projection pattern image generated once may be stored in the parameter storage unit 37 and is read out from the parameter storage unit 37 as needed. When the object to be captured is limited and an optimal projection pattern image is determined beforehand, processing can be simplified to shorten the processing time.

According to this embodiment, red, blue, and green are used as the symbols used for the projection pattern image. Other colors may be used depending on the properties of the measurement target object. In place of the colors, a unique pattern shape or a luminance tone as a code may be assigned to the symbol.

Red, blue, and green are used as symbols for the projection pattern image. For this reason, the de Bruijn sequence for generating the projection code string takes a ternary value. This value can be changed to be more than four or more values depending on the types of symbols used for the projection pattern image and the properties of the measurement target object. When the number of symbols to be used increases, the size of the overall projection code string is increased to widen the range which allows image capturing.

In this embodiment, the size of the partial code string is defined such that the difference between the pieces of distance information obtained in the (i−1)th and (i−2)th measurements is obtained, the sum D of the absolute values of the differences is calculated, and the sum D is used. However, a typical value as the result of distance calculation such as a difference between the average values of the pieces of distance information, a difference between variances, or a difference between median values can be used to define the size of the partial code string.

Unlike this embodiment, the De Bruijn sequence need not necessarily be used as the projection code string. When only two types of symbols are used like in the case wherein a projection pattern image is projected using a monochrome projector, an M-sequence formed from binary codes of 0 and 1 can be used as the projection code string. The M-sequence can be used as follows. Two types of M-sequences, that is, mth- and nth-order M-sequences are selected in the u and v directions, respectively, and the sum of binary values is obtained to similarly generate a projection code string. When the M-sequence is used, although the partial code string becomes relatively long, the number of types of symbols is only two, thereby allowing projection of a high-density projection pattern image.

In this embodiment, the previously measured information is used to determine m and n as the sampling size. However, the distance information need not necessarily be used. Data obtained by processing distance information such as a result of model-fitting the distance information into 3D CAD data may be used. The determination processing in step S1004 may be performed based on the change value of the processed data, thereby changing the identifier.

According to this embodiment, in the three-dimensional measurement technique for projecting a pattern, capturing the reflection pattern from the object, and obtaining distance information by the principle of triangulation, when a pattern on the captured image is to be identified based on prior information, the association processing can be uniquely performed by changing the measurement enable area without changing the measurement density by the precision of the prior information. That is, when prior distance information is available, the measurement enable minimum area can be reduced.

(Second Embodiment)

Figure 11:
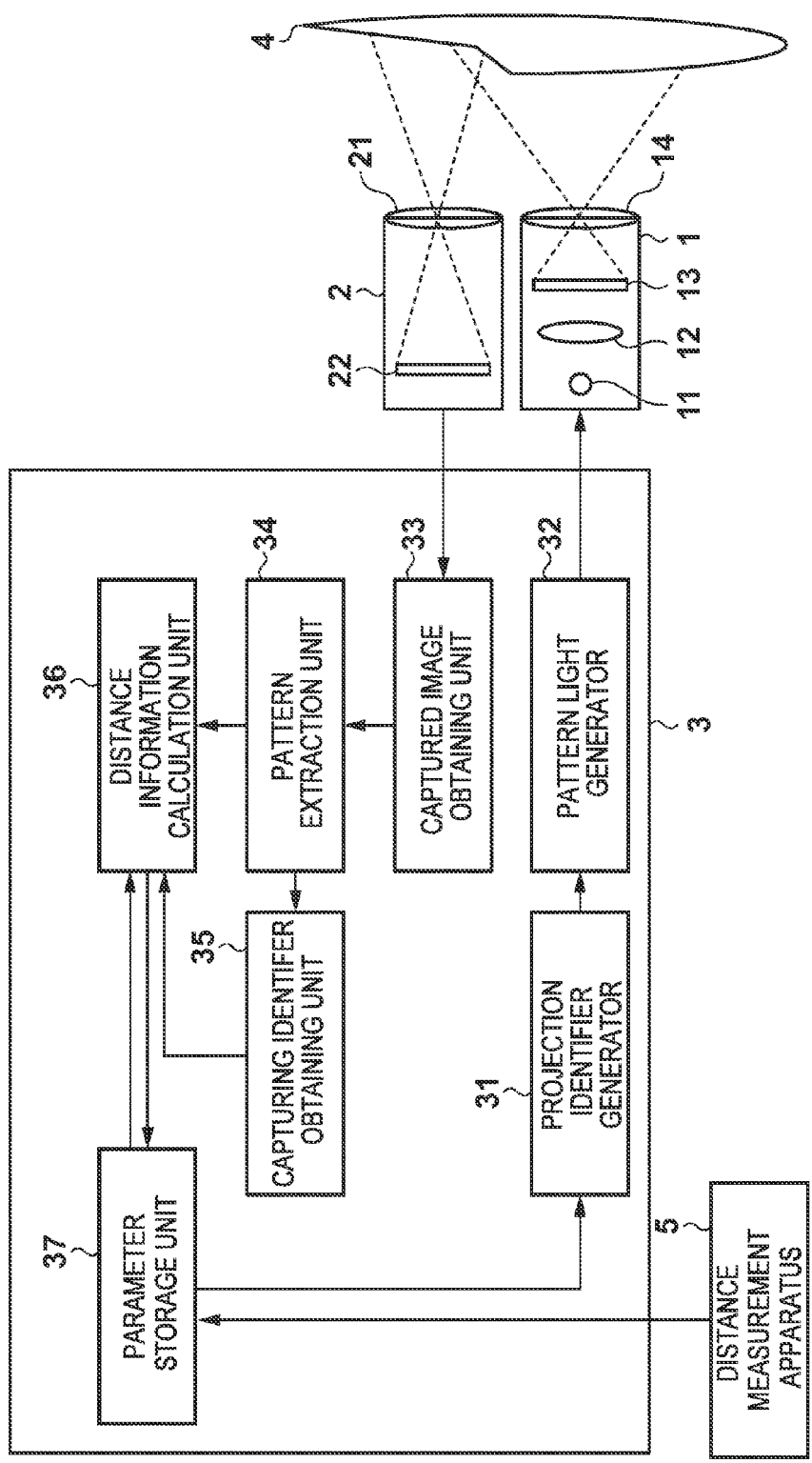
FIG. 11 is a diagram showing the overall arrangement of a three-dimensional shape measurement apparatus according to the second embodiment.

The arrangement of an information processing apparatus according to the second embodiment will be described with reference to FIG. 11. The same processors as in the first embodiment are denoted by the same reference numerals, and a description thereof will not be repeated. The second embodiment is different from the first embodiment in that distance information from a distance information measurement apparatus 5 is used.

Figure 12:
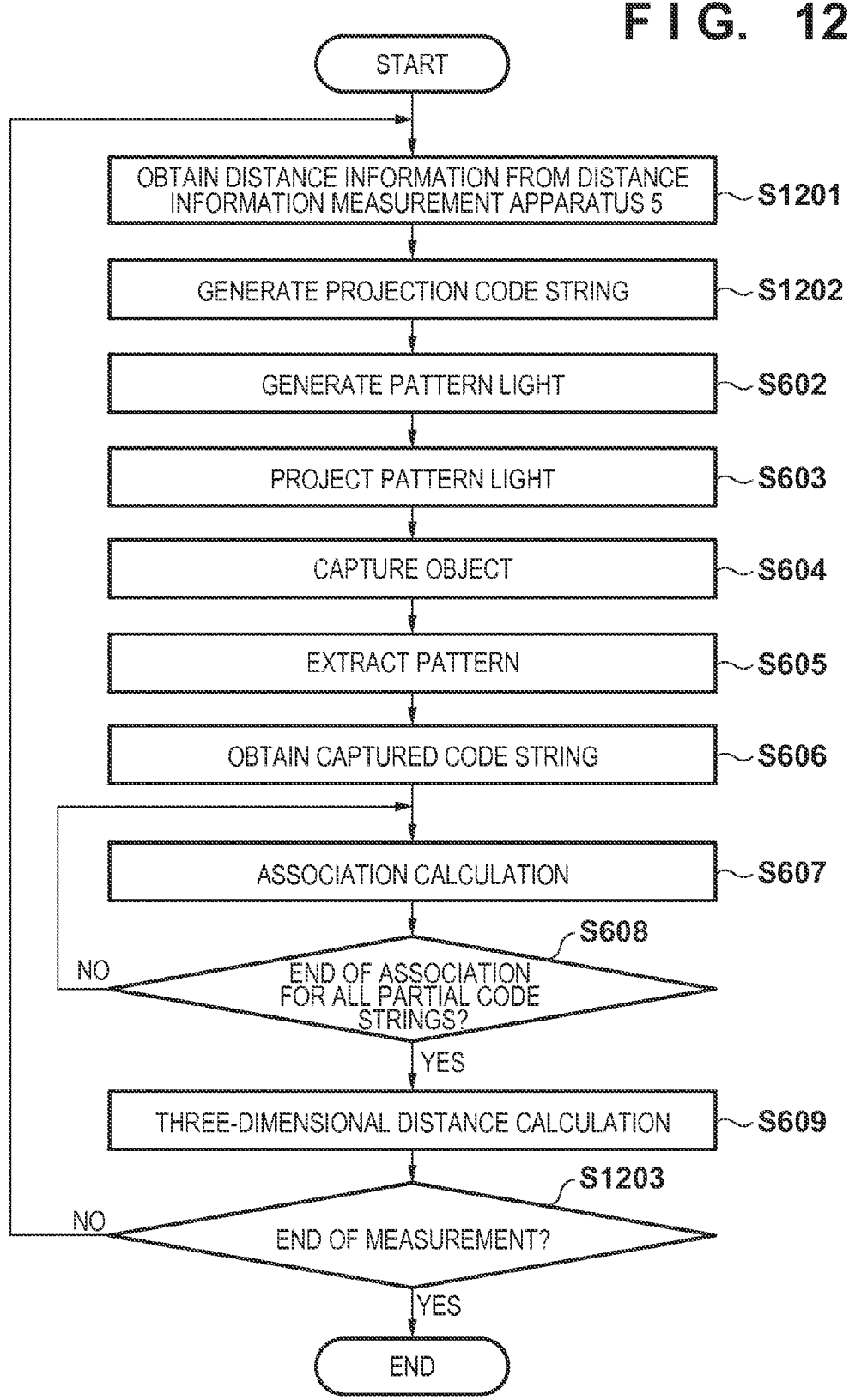
FIG. 12 is a flowchart showing the processing sequence of the three-dimensional shape measurement apparatus according to the second embodiment.

The processing sequence of the information processing apparatus according to the second embodiment will be described with reference to the flowchart of FIG. 12.

In step S1201, a parameter storage unit 37 obtains and stores distance information measured by the distance information measurement apparatus 5.

In step S1202, a projection identifier generator 31 determines m and n which configure the sampling size based on the obtained distance information and generates a projection code string in accordance with de Bruijn sequences. The processing for determining m and n which configure the sampling size based on the distance information measured by the distance information measurement apparatus 5 will be described later with reference to FIG. 13.

The processes in steps S602 to step S609 are the same as in the first embodiment, and a description thereof will not be repeated.

In step S1203, a distance information calculation unit 36 determines as in the first embodiment whether measurement ends. If the unit 36 determines that the measurement ends (YES in step S1203), processing ends; otherwise (NO in step S1203), the process returns to step S1201.

The processing sequence for determining the values of m and n which configure the sampling size in step S1202 based on the distance information measured by the distance information measurement apparatus 5 will be described with reference to the flowchart of FIG. 13.

In step S1301, the projection identifier generator 31 detects points as consecutive depth positions on the surface of a measurement target object 4 and measures its minimum area.

In step S1302, the projection identifier generator 31 determines the lengths m and n of the partial code string from the minimum area of the continuous surface in the depth direction measured in step S1301. For example, m and n are determined as values so as to come close to the minimum area.

In step S1303, the projection identifier generator 31 generates a projection code string table P in accordance with the lengths m and n of the partial code string determined in step S1302. The projection code string table P stores values of the code string obtained when the projection code string is sampled with the lengths m and n at the two-dimensional (u and v) position. Processing then ends.

In this embodiment, the distance information measurement apparatus 5 outputs the distance information, but need not necessarily output the distance information. The apparatus 5 may output a result obtained by model-fitting the distance information into 3D CAD data or a robot arm movement amount controlled based on the above result. The information processing apparatus of this embodiment can precisely control a robot in addition to distance measurement.

According to this embodiment, in the three-dimensional measurement technique for projecting a pattern, capturing the reflection pattern from the object, and obtaining distance information by the principle of triangulation, when a pattern on the captured image is to be identified based on prior information, the association processing can be uniquely performed by changing the measurement enable area without changing the measurement density by the precision of the prior information. That is, when prior distance information is available, the measurement enable minimum area can be reduced.

(Third Embodiment)

The arrangement of an information processing apparatus according to the third embodiment is the same as that of the first embodiment, and a description thereof will not be repeated.

A projection pattern poses the following problem. The position to which the pattern is projected is shifted depending on the distance, ambiguity occurs in specifying a pattern, and association processing becomes difficult. To solve this problem, a projection identifier generator 31 determines values m and n of the sampling size in accordance with a distance measurement range based on the distance information measured in advance, and the association processing is executed. This determination method in this embodiment will be described below.

The processing sequence for determining the values m and n of the sampling size based on the distance information obtained in advance will be described with reference to the flowchart of FIG. 14.

In step S1401, the projection identifier generator 31 determines the distance measurement range based on the distance information obtained in advance.

Figure 15:
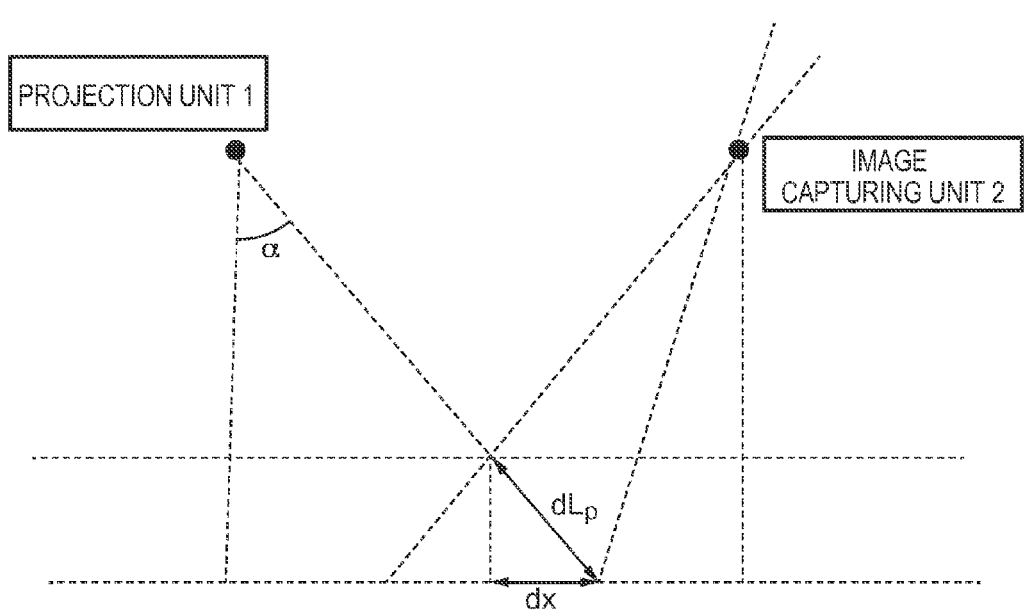
FIG. 15 is a view showing a geometric relationship when determining a distance measurement range.

FIG. 15 shows the geometric relationship when determining the distance measurement range. Letting $dL_p$ be a difference between a distance up to the deepest portion and a distance up to the frontmost portion of the measurement target object 4 measured in advance when the measurement target object 4 is observed from a projection unit 1, α be an azimuth from the image center of the projection image to the measurement point, and dx be the pattern shift on the three-dimensional space by the distance difference $dL_p$, the distance measurement range dx in the three-dimensional space is obtained by:

$$dx = dL_p \sin \alpha \tag{11}$$

Conversion of dx into the projector coordinates yields equation (12):

$$dx_p = \frac{f_p}{L_p} dx \tag{12}$$

where $f_p$ is the focal length of the projection unit 1, and $L_p$ is a value obtained by converting the frontmost distance measured in advance, using extrinsic parameters of the projection unit 1 and an image capturing unit 2 which are stored in a parameter storage unit 37.

Figure 16:
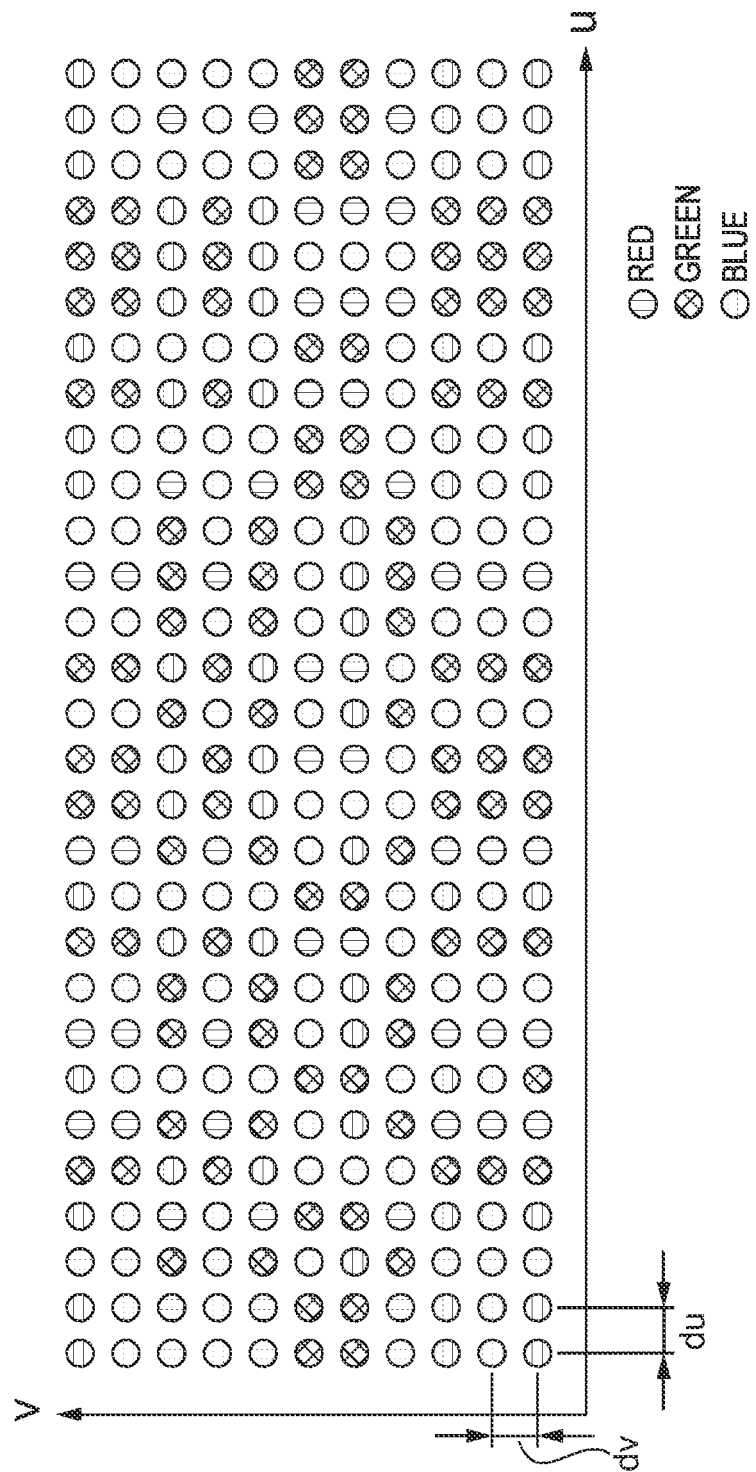
FIG. 16 is a view showing an interval between symbols in a projection pattern image.

In step S1402, the projection identifier generator 31 determines symbols m and n falling within the distance measurement range. More specifically, in the projection pattern image, as shown in FIG. 16, when the symbols are arranged with du in the u direction and dv in the v direction, the number of symbols falling within the distance measurement range obtained by equation (12) is obtained from equations (13) and (14):

$$m = \frac{dx_p}{du} \tag{13}$$

$$n = \frac{dx_p}{dv} \tag{14}$$

Note that decimal parts are generated in m and n, the decimal parts are rounded up to obtain integer values.

In step S1403, the projection identifier generator 31 generates a projection code string table P in accordance with the lengths m and n of the partial code string determined in step S1402. The projection code string table P stores values of the code string obtained when the projection code string is sampled with the lengths m and n at the two-dimensional (u and v) position. Processing then ends.

In this embodiment, $dL_p$ is defined as the difference between the distance up to the deepest portion and a distance up to the frontmost portion of the measurement target object in the distance information measured in advance when the measurement target object is observed from the projection unit 1. However, the distance information need not necessarily be used. A difference between the distance up to the deepest portion and the distance up to the frontmost portion of the measurement target object upon model-fitting the distance information into 3D CAD data may be used. Alternatively, the movement amount of the robot arm controlled by these measurements may be used. The information processing apparatus of this embodiment can precisely control a robot in addition to distance measurement.

According to this embodiment, in the three-dimensional measurement technique for projecting a pattern, capturing the reflection pattern from the object, and obtaining distance information by the principle of triangulation, when a pattern on the captured image is to be identified based on prior information, the association processing can be uniquely performed by changing the measurement enable area without changing the measurement density by the precision of the prior information. That is, when prior distance information is available, the measurement enable minimum area can be reduced.

According to the present invention, the ambiguity in the association processing between the camera and projector in three-dimensional measurement can be reduced and the precision of the three-dimensional measurement can be improved without decreasing the measurement density.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-272745 filed on Dec. 13, 2011, which is hereby incorporated by reference herein in its entirety.

The invention claimed is:

1. An information processing apparatus for generating a projection pattern used in three-dimensional measurement of a target object, the information processing apparatus comprising:
an obtaining unit configured to obtain first distance information of the target object based on a first image obtained by capturing the target object onto which a first projection pattern is projected and to obtain second distance information of the target object based on a second image obtained by capturing the target object onto which a second projection pattern is projected, wherein the first projection pattern is generated based on a first projection code string and the second projection pattern is generated based on a second projection code string;
a determination unit configured to determine a projection code string for generating a projection pattern to be projected based on the first distance information and the second distance information;
a generation unit configured to generate a pattern image of the projection pattern to be projected based on a projection code string determined by the determination unit;
an image capturing unit configured to capture the target object on which the pattern image is projected and to obtain an image;
a pattern obtaining unit configured to extract a captured pattern from the image to obtain a captured code string;
an association unit configured to collate the projection code string with the captured code string to perform association between the projection code string and the captured code string; and
a measurement unit configured to measure distance information of the target object based on the association,
wherein the determination unit determines the projection code string based on the difference between a distance value indicated by the first distance information and a distance value indicated by the second distance information.

2. The information processing apparatus according to claim 1, wherein the determination unit generates a two-dimensional projection code string in horizontal and vertical directions in accordance with a pseudo random number generation method using N-ary (N is an integer of two or more) codes each given in each of the horizontal and vertical directions based on the first distance information and the second distance information.

3. The information processing apparatus according to claim 1, wherein the determination unit determines a partial projection code string that constitutes a part of the projection code string based on the difference.

4. The information processing apparatus according to claim 3, wherein the partial projection code string is generated based on de Bruijn sequence.

5. The information processing apparatus according to claim 3, wherein the partial projection code string indicates a sampling range.

6. The information processing apparatus according to claim 5, wherein the partial projection code string is determined such that a sampling range is smaller than a sampling range of the second projection pattern, in a case where the difference is larger than a threshold, and the partial projection code string is determined such that a sampling range is larger than a sampling range of the second projection pattern, in a case where the difference is smaller than the threshold.

7. A control method for an information processing apparatus for generating a projection pattern used in three-dimensional measurement of a target object, the control method comprising:
a first obtaining step of obtaining first distance information of the target object based on a first image obtained by capturing the target object onto which a first projection pattern is projected, wherein the first projection pattern is generated based on a first projection code string;
a second obtaining step of obtaining second distance information of the target object based on a second image obtained by capturing the target object onto which a second projection pattern is projected, wherein the second projection pattern is generated based on a second projection code string;
a determination step of determining a projection code string for generating a projection pattern to be projected based on the first distance information and the second distance information; and
a generation step of generating a pattern image of the projection pattern to be projected based on a projection code string determined in the determination step;
an image capturing step of capturing the target object on which the pattern image is projected and obtaining an image;
a pattern obtaining step of extracting a captured pattern from the image to obtain a captured code string;
an association step of collating the projection code string with the captured code string to perform association between the projection code string and the captured code string; and
a measurement step of measuring distance information of the target object based on the association,
wherein the projection code string is determined based on the difference between a distance value indicated by the first distance information and a distance value indicated by the second distance information.

8. A non-transitory computer-readable storage medium storing a computer program to cause a computer to execute steps in a control method for an information processing apparatus for generating a projection pattern used in three-dimensional measurement of a target object, the control method comprising:
a first obtaining step of obtaining first distance information of the target object based on a first image obtained by capturing the target object onto which a first projection pattern is projected, wherein the first projection pattern is generated based on a first projection code string;
a second obtaining step of obtaining second distance information of the target object based on a second image obtained by capturing the target object onto which a second projection pattern is projected, wherein the second projection pattern is generated based on a second projection code string;

a determination step of determining a projection code string for generating a projection pattern to be projected based on the first distance information and the second distance information; and a generation step of generating a pattern image of the projection pattern to be projected based on a projection code string determined in the determination step;

an image capturing step of capturing the target object on which the pattern image is projected and obtaining an image;

a pattern obtaining step of extracting a captured pattern from the image to obtain a captured code string;

an association step of collating the projection code string with the captured code string to perform association between the projection code string and the captured code string; and a measurement step of measuring distance information of the target object based on the association, wherein the projection code string is determined based on the difference between a distance value indicated by the first distance information and a distance value indicated by the second distance information.

* * * * *